(12) United States Patent
Sorbo et al.

(10) Patent No.: US 10,462,336 B2
(45) Date of Patent: Oct. 29, 2019

(54) LOW LATENCY TEARING WITHOUT USER PERCEPTION

(71) Applicant: Microsoft Technology Licensing, LLC, Redmond, WA (US)

(72) Inventors: Bennett Sorbo, Seattle, WA (US); Steve Pronovost, Woodinville, WA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 31 days.

(21) Appl. No.: 15/628,292

(22) Filed: Jun. 20, 2017

(65) Prior Publication Data

US 2018/0270399 A1    Sep. 20, 2018

Related U.S. Application Data

(60) Provisional application No. 62/471,811, filed on Mar. 15, 2017.

(51) Int. Cl.
*G06F 3/038* (2013.01)
*H04N 5/073* (2006.01)
(Continued)

(52) U.S. Cl.
CPC ........... *H04N 5/0736* (2013.01); *G09G 5/395* (2013.01); *G09G 5/399* (2013.01); *H04N 5/073* (2013.01);
(Continued)

(58) Field of Classification Search
CPC .. G09G 5/12; G09G 2320/0247; G09G 5/393; G09G 2310/04; G09G 5/397;
(Continued)

(56) References Cited

U.S. PATENT DOCUMENTS 7,173,639 B2    2/2007    Huang
8,108,577 B1    1/2012    Hobbs
(Continued)

FOREIGN PATENT DOCUMENTS

CN          106095366 A    11/2016

OTHER PUBLICATIONS

Jason Jerald, "Latency Compensation for Head-Mounted Virtual Reality", Department of Computer Science University of North Carolina at Chapel Hill, 2004, retrieved from https://www.researchgate.net/publication/246656191_Latency_Compensation_for_Head-Mounted_Virtual_Reality (Year: 2004).*
(Continued)

*Primary Examiner* — Hau H Nguyen
(74) *Attorney, Agent, or Firm* — Arent Fox LLP

(57) ABSTRACT

Methods and devices for presenting a virtual reality image may include rendering at least one image frame received from an application for a virtual reality image for display on a display device. The methods and devices may include receiving a selection of one of a plurality of tear thresholds that define conditions for tearing in a displayed image. The methods and devices may include determining whether the rendered frame is received prior to the selected one of the plurality of tear thresholds, wherein the selected one of the plurality of tear thresholds occurs after a frame timing event that corresponds to a deadline for initiating display of a new frame. The methods and device may include communicating the rendered image frame to the display device for presentation on the display device when the rendered frame is received prior to the selected one of the plurality of tear thresholds.

23 Claims, 6 Drawing Sheets

(51) Int. Cl.
  *G09G 5/395* (2006.01)
  *G09G 5/399* (2006.01)
  *H04N 5/268* (2006.01)
  *G02B 27/01* (2006.01)
  *H04N 5/12* (2006.01)

(52) U.S. Cl.
  CPC ......... *H04N 5/268* (2013.01); *G02B 27/0172* (2013.01); *G09G 2320/0247* (2013.01); *H04N 5/12* (2013.01)

(58) Field of Classification Search
  CPC ....... G06F 3/012; G06F 3/013; G06T 19/006; G06T 7/292
  See application file for complete search history.

(56) References Cited

U.S. PATENT DOCUMENTS

| | | | |
|---|---|---|---|
| 8,307,103 B2 | 11/2012 | Abdo et al. | |
| 8,330,697 B2 | 12/2012 | Lee | |
| 8,866,833 B2 | 10/2014 | Petersen et al. | |
| 9,364,294 B2 | 6/2016 | Razzaque et al. | |
| 9,542,364 B2 | 1/2017 | Sills et al. | |
| 2008/0204464 A1 | 8/2008 | Roh | |
| 2014/0092150 A1 | 4/2014 | Slavenburg et al. | |
| 2016/0035139 A1 | 2/2016 | Fuchs et al. | |
| 2016/0196801 A1 | 7/2016 | Glen | |
| 2016/0247481 A1 | 8/2016 | Colenbrander | |
| 2018/0061121 A1* | 3/2018 | Yeoh ...................... A63F 13/00 |

OTHER PUBLICATIONS

International Search Report & Written Opinion Issued in PCT Application No. PCT/US2018/021428, dated May 29, 2018, 11 Pages.

Chow, et al., "The Effects of HMD Attributes, Different Display and Scene Characteristics on Human Visual Perception of Region Warping Distortions", In the International Journal of Virtual Reality, vol. 6, Issue 1, 2007, pp. 57-68.

* cited by examiner

LOW LATENCY TEARING WITHOUT USER PERCEPTION

RELATED APPLICATION

This application claims priority to U.S. Application No. 62/471,811 titled "Low Latency Tearing Without User Perception," filed Mar. 15, 2017, which is incorporated herein by reference in its entirety.

BACKGROUND

The present disclosure relates to computer graphics systems, and more particularly, to presenting images on a display.

One area of computing devices that has grown in recent years are gaming devices and virtual reality (VR) devices, which use a graphics processing unit (GPU) to render graphics from a computing device to a display device based on rendering instructions received from the computing device. As used herein, a VR device may include a device that generates and/or displays virtual reality images (e.g., from at least one virtual environment input), mixed reality (MR) images (e.g., from at least two virtual environment inputs), and/or augmented reality (AR) images (e.g., from at least one virtual environment input and one real environment input). In gaming devices, a scene produced on a display device can be oriented or modified based on user input (e.g., movement of a gamepad button or stick to cause movement of the orientation of the scene, introduction of items into the scene, etc.). Similarly, in VR devices, the scene produced on a display device can be oriented or modified based on user input, where the input may include detecting movement of the user's head (e.g., detected movement of the VR device, such as a head mounted display (HMD)).

In one mode of operation, such as when a vertical synchronization (V-SYNC) is turned off, the GPU sends a new image to the display for presentation as soon as the new image is generated. When the display receives this new image but is in the middle of presenting a prior image, the initiating of the presentation of the new image may cause tearing of the image on the display. For instance, the tearing in this case may be defined by a top portion of the display presenting the prior image, and a bottom (or lower) portion of the display (e.g., defined by a horizontal scan line) presenting the new image.

This problem may be addressed by leaving on the V-SYNC, however, in VR it is desired to have as little latency as possible in the image. Leaving on the V-SYNC creates a deadline after which any new image may not be presented until a next frame. So, leaving on the V-SYNC may lead to a relatively large amount of latency, for instance, if the new image is not ready in time to meet the V-SYNC deadline, which causes the prior image to be re-presented. In this case, even though the new image is available soon after the V-SYNC deadline, the new image will not be presented until the entire prior image is presented again, leading to a less than desirable user experience.

Thus, there is a need in the art for improvements in presenting VR images on a display.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory and processor. The operating system may be operable to render at least one image frame received from an application for a virtual reality image for display on a display device; receive a selection of one of a plurality of tear thresholds, wherein each of the plurality of tear thresholds define conditions for tearing in a displayed image; determine whether the rendered frame is received prior to the selected one of the plurality of tear thresholds, wherein the selected one of the plurality of tear thresholds occurs after a frame timing event that corresponds to a deadline for initiating display of a new frame; and communicate the rendered image frame to the display device for presentation on the display device when the rendered frame is received prior to the selected one of the plurality of tear thresholds.

Another example implementation relates to a method for presenting a virtual reality image. The method may include rendering, at an operating system executing on a computer device, at least one image frame received from an application for a virtual reality image for display on a display device. The method may also include receiving a selection of one of a plurality of tear thresholds, wherein each of the plurality of tear thresholds define conditions for tearing in a displayed image. The method may also include determining whether the rendered frame is received prior to the selected one of the plurality of tear thresholds, wherein the selected one of the plurality of tear thresholds occurs after a frame timing event that corresponds to a deadline for initiating display of a new frame. The method may also include communicating the rendered image frame to the display device for presentation on the display device when the rendered frame is received prior to the selected one of the plurality of tear thresholds.

Another example implementation relates to computer-readable medium storing instructions executable by a computer device. The computer-readable medium may include at least one instruction for causing the computer device to render at least one image frame received from an application for a virtual reality image for display on a display device. The computer-readable medium may include at least one instruction for causing the computer device to receive a selection of one of a plurality of tear thresholds, wherein each of the plurality of tear thresholds define conditions for tearing in a displayed image. The computer-readable medium may include at least one instruction for causing the computer device to determine whether the rendered frame is received prior to the selected one of the plurality of tear thresholds, wherein the selected one of the plurality of tear thresholds occurs after a frame timing event that corresponds to a deadline for initiating display of a new frame. The computer-readable medium may include at least one instruction for causing the computer device to communicate the rendered image frame to the display device for presentation on the display device when the rendered frame is received prior to the selected one of the plurality of tear thresholds.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides devices and methods for presentation of virtual reality (VR) images on a display. The devices and methods may configure a plurality of different tearing thresholds in a computer graphics system to define conditions when certain amounts of tearing may be allowed in order to present the most up-to-date image. For example, the tearing thresholds may correspond to a blanking period, an optically visible area of the image, or an inconsequentially visible area of the image. The described devices and methods enable a VR image to be presented on a display with tearing that is either imperceptible, or tolerable, by a user, thereby enabling presentation of the most up-to-date image information.

Figure 1:
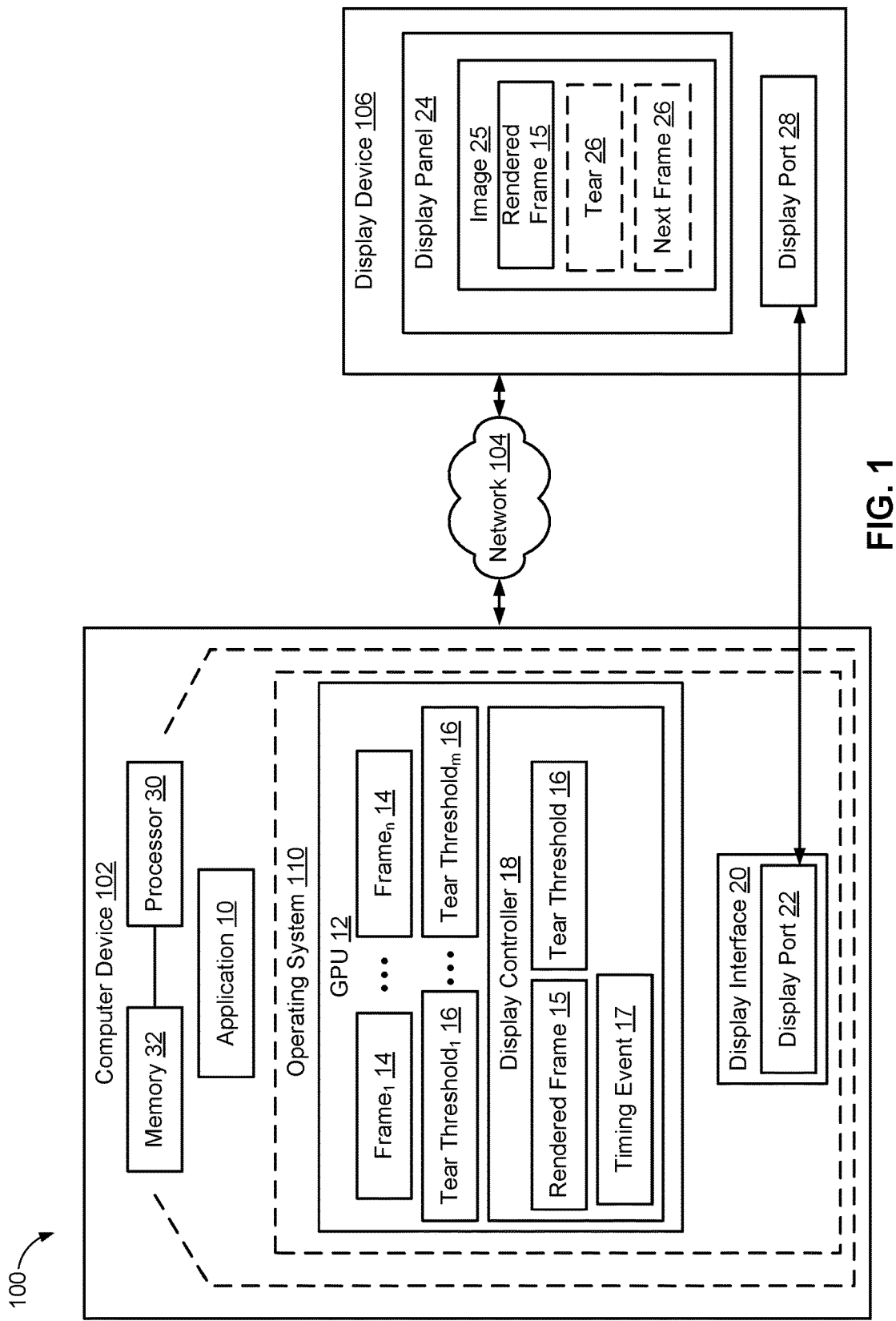
FIG. 1 is a schematic block diagram of an example device in accordance with an implementation of the present disclosure.

Referring now to FIG. 1, an example system 100 for use in connection with presenting VR images may include a computer device 102 in communication with a display device 106. Computer device 102 may communicate image data for displaying VR images on display device 106. Display device 106 may include, for example, a head mounted display (HMD) or a monitor.

Computer device 102 may include an operating system 110 executed by processor 30 and/or memory 32 of computer device 102. Memory 32 of computer device 102 may be configured for storing data and/or computer-executable instructions defining and/or associated with operating system 110, and processor 30 may execute operating system 110. An example of memory 32 can include, but is not limited to, a type of memory usable by a computer, such as random access memory (RAM), read only memory (ROM), tapes, magnetic discs, optical discs, volatile memory, non-volatile memory, and any combination thereof. An example of processor 30 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Operating system 110 may include a graphics processing unit (GPU) operable to render one or more image frames 14 and determine when to transmit rendered image frames 15 for presentation on display device 106. Operating system 110 may also include a display interface 20 that may be communicatively coupled with the processor 30 and/or memory 32 for communicating with the display device 106 via a display port 22. Display port 22 may include various types of ports including, but not limited to, high definition multimedia interface (HDMI) ports, display serial interface (DSI) ports, mobile industry processor interface (MIPI) DSI ports, universal serial bus (USB) ports, Firewire ports, or other embedded or external wired or wireless display ports that can allow communications, for example, via network 104 between computing device 102 and display device 106.

Computer device 102 may also include one or more applications 10 that may be executed by processor 30 to present one or more images 25 on display device 106. For example, application 10 may be a virtual reality application that generates a virtual world, such as but not limited to, a virtual reality game or collaborative work environment. Application 10 may provide image information regarding the virtual world to GPU 12.

GPU 12 may render one or more image frames 14 (e.g., 1 to n, where n is a positive number) based on the image information received from application 10. The rendering operation may be a computationally intense operation. The time for completing the rendering operation may depend on the quality of the displayed images 25 being produced. For example, the rendering time may be based on factors such as resolution and number of colors, as well as quality of various visual effects (e.g., shadows or particles). The quality of the images 25 may be adjusted based on hardware capability so that the GPU 12 may be capable of generating new rendered frames 15 at the refresh rate, for example, prior to a timing event 17.

GPU 12 may transmit one or more rendered frames 15 to display controller 18. Display controller 18 may determine whether the render frame 15 is received prior to a timing event 17, such as a V-SYNC event, which may correspond to the refresh rate of the display device 106 when a new image 25 may be presented on display panel 24. In other words, the timing event 17 may correspond to a deadline for initiating presentation of a new frame by display device 106.

When the rendered frame 15 is received prior to the timing event 17, e.g., a V-SYNC, display controller 18 may instruct display interface 20 to communicate the rendered frame 15 to display device 106 for presentation on display device 106. Display interface 20 may communicate with display device 102 via display port 22. For example, display interface 20 may transmit rendered frame 15 to display port 28 on display device 106. Display port 28 may communicate with display panel 24 and display panel 24 may present image 25 defined by the rendered frame 15.

In prior solutions, when the rendered frame 15 is received after the timing event 17, e.g., the V-SYNC, display controller 18 operating with V-SYNC turned ON would instruct display interface 20 to communicate a prior rendered frame to display device 106 for presentation on display panel 24. Alternatively, display controller 18 may instruct display interface 20 to instruct display device 106 to re-present the last frame (e.g., the prior rendered frame) on display panel 24. As noted above, in some applications such as in presenting VR images, this leads to an unacceptable amount of user-perceived latency in the displayed images 25.

In order to reduce image latency, computer device 102 may operate with V-SYNC turned OFF, and computer device 102 may be additionally configured to minimize user-perception of a tear 26 in image 25 in order to present the most up-to-date image information. Specifically, GPU 12 operating with V-SYNC turned OFF may include one or more tear thresholds 16 (e.g., 1 to m, where m is a positive number) that may occur at one or more times after the timing event 17 to define when tearing 26 in a currently displayed image 25 may be allowed. For instance, the one or more tear thresholds 16 each define a respective maximum point in time after the timing event 17 to communicate rendered frame 15 to display device 106 and switch the displayed image 25 from the prior rendered frame to the current rendered frame 15. When this switch occurs, tear 26 in image 25 may occur, although based on the present implementation, such tear 26 may or may not be visible on display panel 24 of display device 106. The tear 26 may be defined by an inconsistency between adjacent portions of image 25, e.g., an inconsistency between displaying the previously prior rendered frame and the current rendered frame 15. Further, the tear thresholds 16 may define selectable conditions when certain amounts of tearing will be allowed in order to present the most up-to-date image. Example tearing thresholds 16 may include, but are not limited to, one or more of a blanking period threshold, an optically visible threshold, or an inconsequentially visible threshold.

The blanking period threshold may correspond to a period of time, such as a blanking period, when the display device 106 is scanning or traversing from the bottom right of the display panel 24 to the top left of the display panel 24 in order to initiate presentation of the next image 25. The blanking period may also be referred to as a vertical blanking interval. In this period of time, the display panel 24 is not displaying any new pixels even though display device 106 may have received at least a portion of a current rendered frame 15. As such, when tearing threshold 16 corresponds to the blanking period threshold, the tearing threshold 16 may define a timing in which the user will not see the tear 26 when viewing image 25.

The optically visible threshold may correspond to an area of an image that defines a boundary between what is or is not optically visible to a user. For instance, in VR, the image 25 that is presented may include different lens areas that define visible areas based on the optics of the VR system. As such, the optically visible threshold may vary based on the hardware specifications of display device 106. As an example, a top portion of the image 25 may be outside of the visible area, and thus the optically visible threshold may correspond to a scan line within the image 25 above (or at the edge of or adjacent to) the visible area. Thus, the optically visible threshold may define an area within an image where the user will not see the tear 26.

The inconsequentially visible threshold may correspond to a visible area within the image 25, but at a portion of the image 25 where the user may not mind seeing the tear 26. In some cases, the inconsequentially visible threshold may be defined by a percentage of the image 25. For example, this threshold may be set so as to allow the tear 26 as long as less than 50% of the image 25 is presented. In other cases, the inconsequentially visible threshold may be defined by a content presented in the image 25. For example, this threshold may allow the tear 26 in an upper portion of the image 25 that may be displaying "sky" or some other object where the tear 26 in that portion of the image 25 may be determined to be tolerable to a user as the content may not be deemed important content. In another case, the inconsequentially visible threshold may be defined by a difference in content presented in consecutive images. For example, this threshold may allow the tear 26 in a portion of the image 25 where a delta or change in the characteristics (e.g., color, texture, intensity, etc.) of the image 25 is below a change threshold (e.g., defined by a change in pixel characteristics, such as color, texture, intensity, etc.). In further cases, the inconsequentially visible threshold may be defined by eye tracking information. For example, this threshold may allow the tear 26 in a portion of the image 25 that is above, or away from, a position in the image 25 where the eyes of a user are focused. Thus, the inconsequentially visible threshold defines an area within the image 25 where the user may not mind seeing the tear 26.

Display controller 18 may select one or more tear thresholds 16 for use with rendered image frame 15, for example, in response to information received by operating system 110 or in response to application 10 for which the images 25 are being generated. For instance, in one implementation, operating system 110 may receive optics information of the display device 106, such as an HMD, and operating system 110 may identify one or more tear thresholds 16 based on the optics information received. In addition, operating system 110 may receive user input indicating, for example, preferences for the tear 26 (e.g., a preference for the tear 26 to be outside the visible area of the image 25) and operating system 110 may identify one or more tear threshold 16 based on the user input. Another example may include, operating system 110 identifying one or more tear thresholds 16 based on the rendered content. In one implementation, display controller 18 may select the tearing threshold 16 that allows tearing as late as possible within the presentation of image 25. For example, if the inconsequential visible tear threshold provides more time for rendering the image frame 15 relative to other tearing thresholds 16, display controller 18 may select the inconsequential visible tear threshold. In another implementation, display controller 18 may select the tearing threshold 16 that is identified in a command received from an application 10. For example, if application 10 indicates a preference for the tear 26 to be outside of the visible area of the image 25 as perceived by a user, display controller 18 may select the blanking period threshold and/or the optically visible threshold.

Display controller 18 may instruct display interface 20 to communicate the rendered frame 15 to display device 106 for presentation on display device 106 when the rendered frame 15 is received after the timing event 17 but prior to the selected tearing thresholds 16. As such, the image 25 presented on display panel 24 may include the tear 26 between the prior rendered frame presented on display panel 24 and the current rendered frame 15. Tear 26 may be imperceptible, or tolerable, by a user, thereby enabling presentation of the most up-to-date image information.

When the rendered frame 15 is received after the timing event 17, e.g., the V-SYNC, and also after the selected tear threshold 16, display controller 18 may instruct display interface 20 to communicate the prior rendered frame to display device 106 for presentation on display device 106, or to re-present the prior rendered frame. Because GPU 12 generates rendered frame 15 after the selected tear threshold 16, this new rendered image frame 15 may not be presented until the next timing event 17 (e.g., the next V-SYNC).

Figure 2:
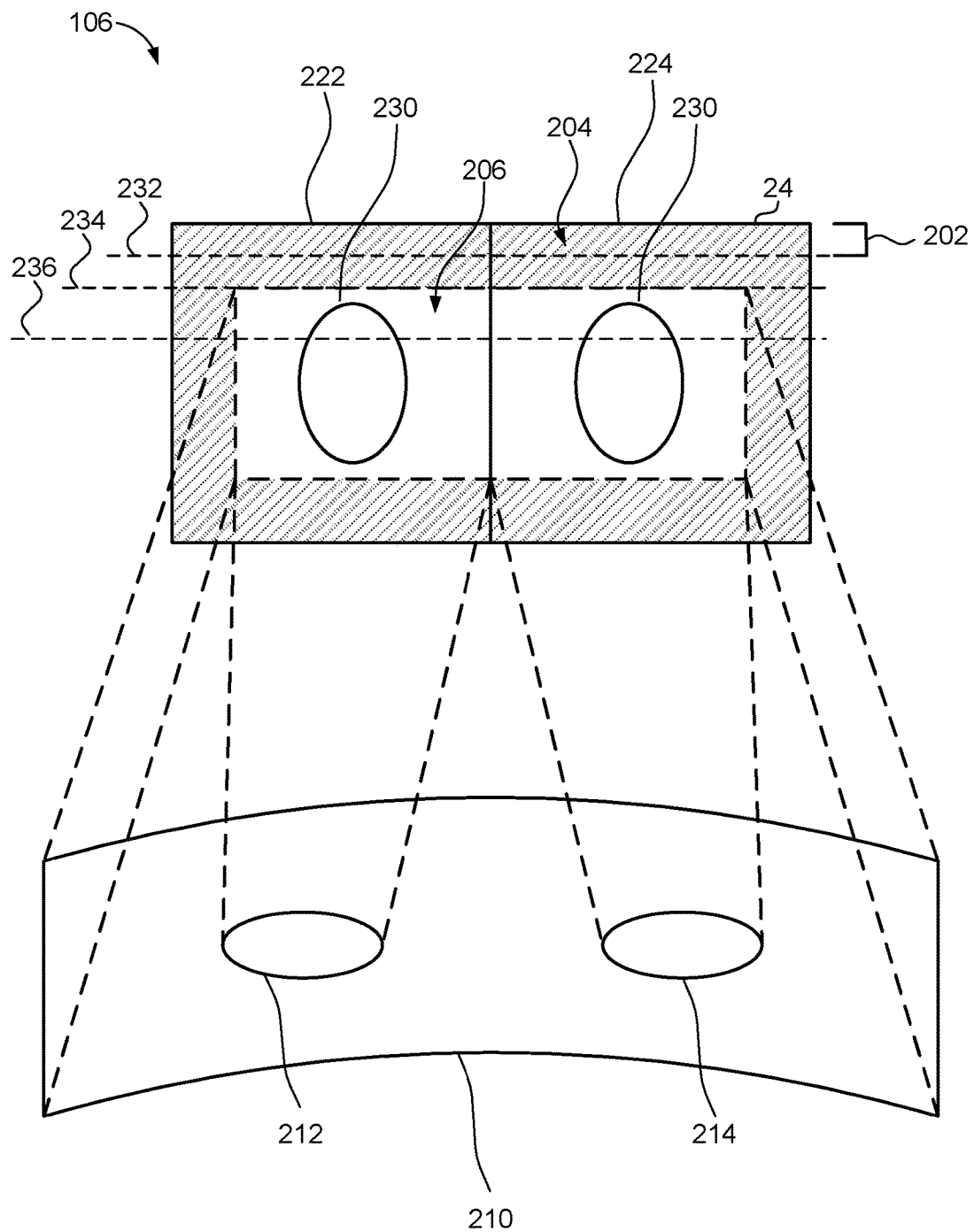
FIG. 2 is a schematic diagram of optics and a display panel of a head mounted display for displaying virtual reality images in accordance with an implementation of the present disclosure.

Referring now to FIG. 2, a conceptual diagram illustrates operation of a lens and display of an example display device 106, such as an HMD, in accordance with an implementation. The display device 106 may include optics 210 (e.g., one or more lenses) for focusing a user's vision on one or more portions of one or more display panels 24. For example, the display panels 24 may include a liquid crystal display (LCD) (which may include a light emitting diode (LED) backlit LCD display), organic LED (OLED) display, digital light processing (DLP) display, etc. The display panels 24 may display one or more images (e.g., left eye image 222 and right eye image 224) based on signals received from display controller 18 (FIG. 1). In an implementation, display controller 18 may provide display device 106 with multiplexed left eye image 222 and right eye image 224 in a side-by-side arrangement. It should be appreciated that the left eye image 222 and right eye image 224 may also be multiplexed vertically or in time. The display panels 24 may scan an image (e.g., rendered frame 15) from the display port 28 (FIG. 1). As used herein, scanning may refer to a process of updating pixels on the display panel(s) 24.

The optics 210 may include left eye optics 212 for focusing the user's left eye on the left eye image 222 and right eye optics 214 for focusing the user's right eye on the right eye image 224. For example, the optics 210 may focus the user's eyes on a central portion of each of the left eye image 222 and the right eye image 224. The user's brain may combine the images viewed by each eye to create the perception that the user is viewing a 3D environment. For example, both the left eye image 222 and the right eye image 224 may include an object 230 that may be perceived as a three dimensional object.

A top portion 202 of the left eye image 222 and right eye image 224, e.g., a certain number of scan lines from the top of the images, may correspond to a blanking period. As such, blanking period threshold 232 may be set to correspond to a timing after the timing event 17 during which the top portion 202 of the image would not be displayed due to the blanking period.

A border portion 204 of the left eye image 222 and right eye image 224 may be displayed by the display panel 24, but may not be visible to the user due to the optics 210. As such, tear 26 (FIG. 1) in the left eye image 222 and right eye image 224 occurring in border portion 204 may not be visible to the user. As such, an optically visible threshold 234 may be set to correspond to border portion 204, or at least to the top (e.g., not sides or bottom) border portion 204. In other words, optically visible threshold 234 may be set such that a current rendered frame 15 (FIG. 1) can start to be presented by display device 106 at scan line below the top border portion 204.

In addition, left eye image 222 and right eye image 224 may include an inconsequentially visible area 206, such as a visible area outside of the main focus within left eye image 222 and right eye image 224, where the user may not mind seeing a tear 26 in the image. As such, an inconsequentially visible threshold 236 may be set to correspond to inconsequentially visible area 206. If a tear 26 occurs in the image in an area before the visible threshold 206, the tear 26 may be inconsequential to a user viewing the left eye image 222 and the right eye image 224. Accordingly, inconsequentially visible threshold 236 may be set such that a current rendered frame 15 (FIG. 1) can start to be presented by display device 106 at a scan line below the inconsequentially visible area 206.

Figure 3:
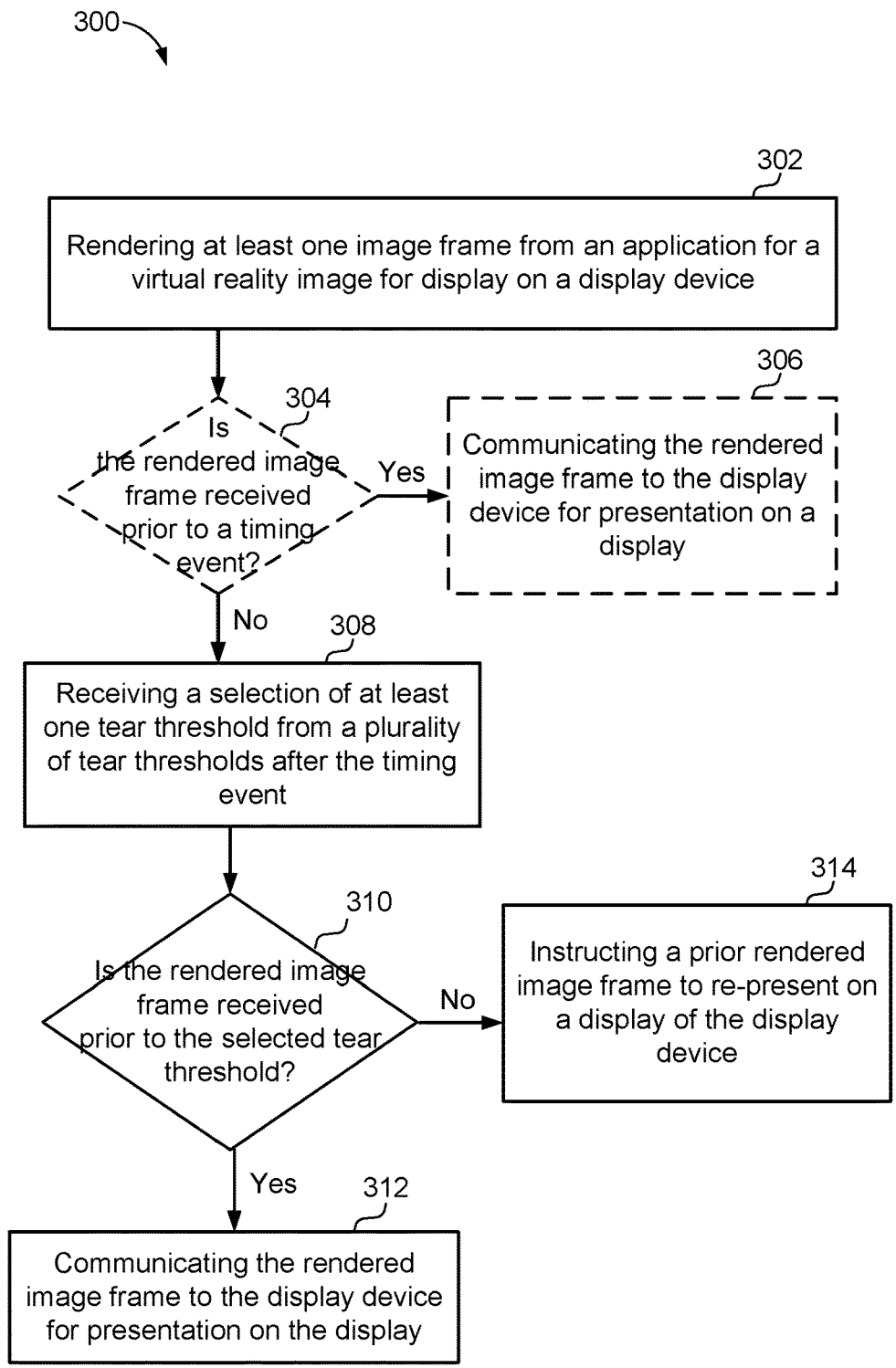
FIG. 3 is a flow chart of a method for displaying virtual reality images in accordance with an implementation of the present disclosure.

Referring now to FIG. 3, a method 300 for presenting VR images may be implemented on operating system 110 (FIG. 1) of computer device 102 (FIG. 1). Method 300 may operate with V-SYNC turned OFF in order to enable the most up-to-date images to be displayed.

At 302, method 300 may include rendering at least one image frame from an application for a virtual reality image for display on a display device. For example, GPU 12 (FIG. 1) may render one or more image frames 14 for presentation on display device 106 (FIG. 1). GPU 12 may receive image information regarding a virtual world from application 10 for rendering image frames 14 to represent the virtual world.

At 304, method 300 may optionally include determining whether the rendered image frame is received prior to a timing event. For example, display controller 18 may receive rendered frame 15 from GPU 12. Display controller 18 may determine whether the render frame 15 is received prior to a timing event 17, such as a V-SYNC event, which may correspond to the refresh rate of the display device 106 when a new image 25 may be presented on display panel 24. In other words, the timing event 17 may correspond to a deadline for initiating presentation of a new frame by display device 106.

At 306, method 300 may optionally include communicating the rendered image frame to the display for presentation on a display when the rendered frame is received prior to the timing event. When display controller 18 determines that the rendered frame 15 is received prior to the timing event 17 (e.g., V-SYNC), display controller 18 may instruct display interface 20 to communicate the rendered frame 15 to display device 106 for presentation on display device 106.

At 308, when the rendered image frame is received after the timing event, method 300 may include receiving a selection of at least one tear threshold from a plurality of tear thresholds. For example, each of the plurality of tear thresholds may occur after a frame timing event that corresponds to a deadline for initiating display of a new frame. The tear thresholds may define selectable conditions for tearing in a displayed image. For example, the tear thresholds may define when certain amounts of tearing may be allowed in order to present the most up-to-date image. The tear threshold may include a maximum point in time after the timing event to present the frame being rendered and generate a tear in an image currently presented on the display.

Specifically, GPU 12 (FIG. 1) may have a plurality of different tearing thresholds 16 (FIG. 1) to select from. For example, one of the plurality of tearing thresholds may correspond to a blanking period threshold 232 (FIG. 2). The blanking period threshold 232 may be set to correspond to a timing after the timing event 17 (FIG. 1) during which the top portion 202 (FIG. 2) of the image would not be displayed due to the blanking period. The blanking period threshold 232 may also be referred to as a vertical blanking interval. In this period of time, the display panel 24 is not displaying any new pixels even though display device 106 may have received at least a portion of a current rendered frame 15. As such, the blanking period threshold 232 may define a timing where the user will not see the tear when viewing image 25.

In another example, one of the plurality of tearing thresholds may correspond to an optically visible threshold 234 (FIG. 2). The optically visible threshold 234 may correspond to an area of an image that defines a boundary between what is or is not optically visible to a user. For instance, in VR, the image 25 that is presented may include different lens areas that define visible areas based on the optics of the VR system. As such, the optically visible threshold may vary based on the hardware specifications of display device 106. As an example, a top portion of the image 25 may be outside of the visible area and the optically visible threshold may correspond to a scan line within the image 25 above (or at the edge of or adjacent to) the visible area. Thus, the optically visible threshold may define an area within an image where the user will not see the tear 26.

In another example, one of the plurality of tearing thresholds may correspond to inconsequentially visible threshold 236 (FIG. 2). For instance, the inconsequentially visible threshold may correspond to a visible area within the image, but at a portion of the image where the user may not mind seeing the tear. As such, the inconsequentially visible threshold may define an area within an image where the user may not mind seeing the tear.

Display controller 18 may select one or more tear thresholds 16 for use with a given image frame, for example, in response to information received by operating system 110 or in response to an application for which the images are being generated. For instance, in one implementation, display controller 18 may select the tearing threshold 16 that allows tearing as late as possible within the presentation of an image 25. For example, if the inconsequentially visible threshold 236 provides more time for rendering the image frame relative to other tearing thresholds 16, display controller 18 may select the inconsequentially visible threshold 236. In another implementation, display controller 18 may select the tearing threshold 16 that may be identified in a command received from an application 10. For example, if application 10 indicates a preference for the tear 26 to be outside of the visible area perceived by a user, display controller 18 may select the blanking period threshold 232 and/or the optically visible threshold 234.

At 310, method 300 may include determining whether the rendered image frame is received prior to the selected one of a plurality of tear thresholds. For example, display controller 18 may determine whether rendered frame 15 is received prior to the selected tear threshold 16.

At 312, method 300 may include communicating the rendered image frame to the display device for presentation on the display when the rendered image frame is received prior to the selected one of the plurality of tear thresholds. Display controller 18 may instruct display interface 20 to communicate the rendered frame 15 to display device 106 for presentation on display device 106 when the rendered frame 15 is received after the timing event 17 but prior to the selected tearing thresholds 16. As such, the image 25 presented on display panel 24 may include the tear 26 between the prior rendered frame presented on display panel 24 and the current rendered frame 15. Tear 26 may be imperceptible, or tolerable, by a user, thereby enabling presentation of the most up-to-date image information.

At 314, method 300 may include instructing a prior rendered image frame to re-present on a display of the display device when the image frame is rendered after the selected tear threshold. Display controller 18 may instruct display interface 20 to instruct display device 106 to re-present the last frame (e.g., the prior rendered frame) on display panel 24. As such, because GPU 12 rendered image frame 15 after the selected tear threshold 16, the new image frame may not be presented until the next timing event 17.

Figure 4:
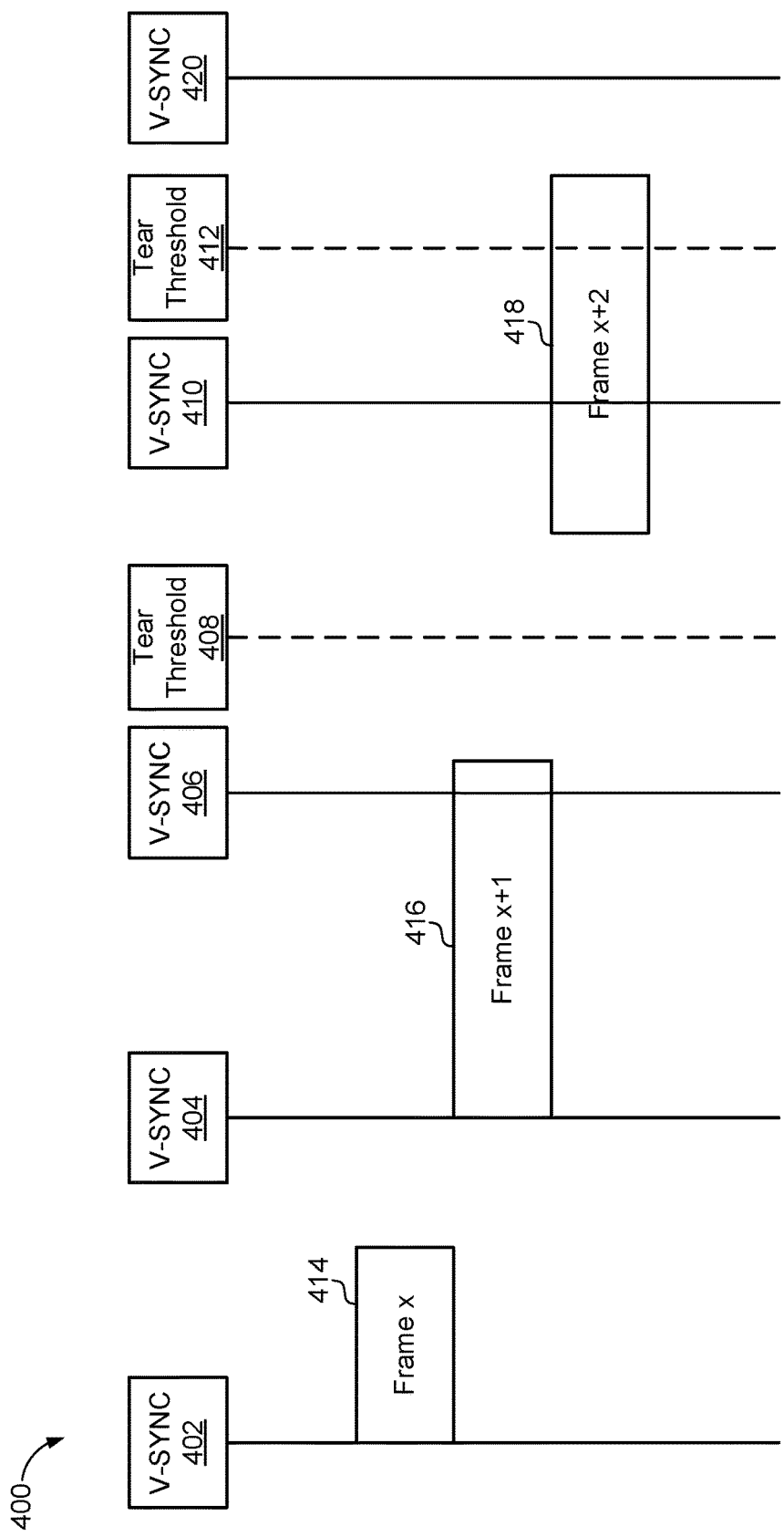
FIG. 4 is a timing diagram illustrating image processing in accordance with an implementation of the present disclosure.

Referring now to FIG. 4, an example timing diagram 400 illustrates rendering and display of images using a GPU 12 and a display controller 18. Display controller 18 may have periodic V-SYNC events 402, 404, and 410, which may correspond to the refresh rate of the display device 106. For example, a refresh rate for virtual reality may be 90 Hz, resulting in a V-SYNC event 402, 404, 410 every 11 milliseconds. In addition, display controller 18 may have selected tear thresholds 408 and 412 that may define points in time where a rendered image frame may be presented after a V-SYNC has occurred. For example, tear thresholds 408 and 412 may be blanking period threshold 232 (FIG. 2), optically visible threshold 234 (FIG. 2), or inconsequentially visible threshold 236 (FIG. 2).

The GPU 12 may render one or more image frames 414, 416, and 418 for presentation on display device 106. The time for completing the rendering of image frames 414, 416, and 418 may depend on the quality of the rendered images being produced. For example, the rendering time may be based on factors such as, but not limited to, resolution and number of colors, as well as quality of various visual effects (e.g., shadows or particles). The quality of the images may be adjusted based on hardware capability such that the GPU 12 may be capable of rendering new frames at the refresh rate (e.g., V-SYNC 402, 404, and 410).

In the illustrated example, GPU 12 renders image frame 414 prior to V-SYNC 404. As such, display controller 18 may transmit image frame 414 for presentation on display panel 24 of display device 106 at V-SYNC 404.

Figure 5:
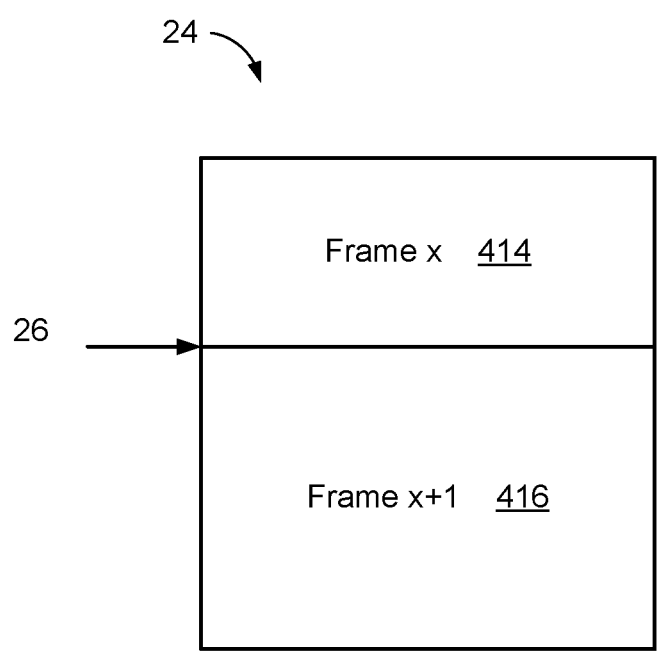
FIG. 5 is schematic diagram of an image with two image frames displayed with a tear between the image frames.

In the illustrated example, GPU 12 is unable to finish rendering image frame 416 prior to the next V-SYNC 406 but finishes rendering image frame 416 prior to tear threshold 408. Since the image frame 416 was not completed prior to V-SYNC 406, display controller 18 may retransmit the previous image frame 414 for display at V-SYNC 406. However, because GPU 12 finished rendering image frame 416 prior to tear threshold 408, display controller 18 may transmit image frame 416 for presentation on display panel 24 of display device 106 even though image frame 416 was not completed by V-SYNC 406. As such, display panel 24 may present both image frame 414 and image frame 416. There may be a tear 26 between the previous image frame 414 already starting to present on the display panel 24 and the new image frame 416 transmitted for presentation, as illustrated in FIG. 5. Tear 26 may be either imperceptible, or tolerable, by a user viewing display panel 24, because tear 26 may be in the area that corresponds to the blanking period, or the top border area, or the inconsequential area, all as defined by the thresholds 232, 234, or 236, thereby enabling presentation of the most up-to-date image information on display panel 24.

In addition, in the illustrated example in FIG. 4, GPU 12 is unable to finish rendering image frame 418 prior to the next V-SYNC 410. GPU 12 completes the rendering of the frame 418 after tear threshold 412. As discussed above, display controller 18 may decide to continue to present previous image frame 416 because flipping to image frame 418 prior to V-SYNC 420 may provide a poor user experience. At V-SYNC 420, display controller may transmit image frame 418 for presentation on display panel 24.

Figure 6:
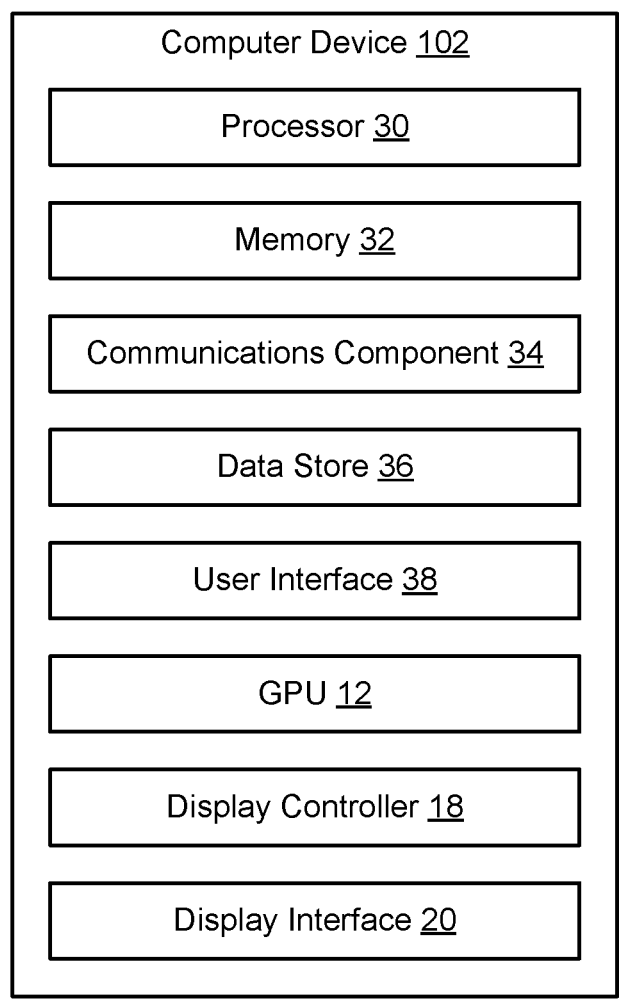
FIG. 6 is a schematic block diagram of an example device in accordance with an implementation of the present disclosure.

Referring now to FIG. 6, illustrated is an example computer device 102 in accordance with an implementation, including additional component details as compared to FIG. 1. In one example, computer device 102 may include processor 30 for carrying out processing functions associated with one or more of components and functions described herein. Processor 30 can include a single or multiple set of processors or multi-core processors. Moreover, processor 30 can be implemented as an integrated processing system and/or a distributed processing system.

Computer device 102 may further include memory 32, such as for storing local versions of applications being executed by processor 30. Memory 32 can include a type of memory usable by a computer, such as random access memory (RAM), read only memory (ROM), tapes, magnetic discs, optical discs, volatile memory, non-volatile memory, and any combination thereof. Additionally, processor 30 and memory 32 may include and execute operating system 110 (FIG. 1).

Further, computer device 102 may include a communications component 34 that provides for establishing and maintaining communications with one or more parties utilizing hardware, software, and services as described herein. Communications component 34 may carry communications between components on computer device 102, as well as between computer device 102 and external devices, such as devices located across a communications network and/or devices serially or locally connected to computer device 102. For example, communications component 34 may include one or more buses, and may further include transmit chain components and receive chain components associated with a transmitter and receiver, respectively, operable for interfacing with external devices.

Additionally, computer device 102 may include a data store 36, which can be any suitable combination of hardware and/or software, that provides for mass storage of information, databases, and programs employed in connection with implementations described herein. For example, data store 36 may be a data repository for applications 10 (FIG. 1), GPU 12 (FIG. 1), display controller 18 (FIG. 1), and/or display interface 20 (FIG. 1).

Computer device 102 may also include a user interface component 38 operable to receive inputs from a user of computer device 102 and further operable to generate outputs for presentation to the user. User interface component 38 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 38 may include one or more output devices, including but not limited to a display, a speaker, a haptic feedback mechanism, a printer, any other mechanism capable of presenting an output to a user, or any combination thereof.

In an implementation, user interface component 38 may transmit and/or receive messages corresponding to the operation of applications 10, GPU 12, display controller 18, and/or display interface 20. In addition, processor 30 executes applications 10, GPU 12, display controller 18, and/or display interface 20, and memory 32 or data store 36 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions;
   a processor in communication with the memory; and
   an operating system in communication with the memory and the processor, wherein the operating system is operable to:
   render at least one image frame received from an application for a virtual reality image for display on a display device;
   determine that the rendered frame is received after a frame timing event that corresponds to a deadline for initiating display of a new frame,
   communicate a prior rendered frame for presentation on the display device or communicate an instruction to re-present the prior rendered frame on the display device;
   receive a selection of one of a plurality of tear thresholds, wherein each of the plurality of tear thresholds define different tear conditions, at a point in time after the frame timing event, when an amount of tearing in a displayed image is allowed;
   determine whether the rendered frame meets a tear condition defined by the selected one of the plurality of tear thresholds; and
   communicate the rendered image frame to the display device to switch the presentation from the prior rendered frame to the rendered image frame on the display device in response to the rendered frame meeting the tear condition defined by the selected one of the plurality of tear thresholds.

2. The computer device of claim 1, wherein the selected one of the plurality of tear thresholds comprises a blanking period threshold.

3. The computer device of claim 1, wherein the selected one of the plurality of tear thresholds comprises an optically visible area threshold that defines the tear condition as corresponding to an area of an image that defines a boundary between what is optically visible to a user or not optically visible to the user.

4. The computer device of claim 1, wherein the selected one of the plurality of tear thresholds comprises an inconsequentially visible area threshold that defines the tear conditions as corresponding to a visible area of an image where a tear is inconsequential to a user viewing the prior rendered frame and the rendered image frame.

5. The computer device of claim 1, wherein the timing event is a vertical synchronization.

6. The computer device of claim 1, wherein the selected one of the plurality of tear thresholds is selected based on a command received by the application.

7. The computer device of claim 1, wherein the selected one of the plurality of tear thresholds is selected based on one or more of optics information of the display device, rendered content, and user input.

8. The computer device of claim 1, wherein in response to the rendered frame being received after the selected one of the plurality of tear thresholds, the operating system is further operable to communicate a prior rendered frame for presentation on the display or to communicate an instruction to re-present the prior rendered frame.

9. The computer device of claim 1, wherein the display devices comprises a display that presents a portion of a prior rendered frame and switches to presenting a current rendered frame in response to the operating system receiving the frame by the selected one of the plurality of tear thresholds.

10. The computer device of claim 1, wherein the display device is a head mounted display.

11. The computer device of claim 1, wherein the operating system is further operable to identify the plurality of tear thresholds based on optics information of the display device.

12. The computer device of claim 1, wherein the operating system is further operable to identify the plurality of tear thresholds based on application information.

13. The computer device of claim 1, wherein the operating system operable to identify the plurality of tear thresholds based on received user preferences on tearing in a displayed image.

14. A method for presenting a virtual reality image, comprising:
   rendering, at an operating system executing on a computer device, at least one image an application for a virtual reality image for display on a display device;
   determining that the rendered frame is received after a frame timing event that corresponds a deadline for initiating display of a new frame;
   communicating a prior rendered frame for presentation on the display device or communicate an instruction to re-present the prior rendered frame on the display device;
   receiving a selection of one of a plurality of tear thresholds, wherein each of the plurality of tear thresholds define different tear conditions, at a point in time after the frame timing event, when an amount of tearing in a displayed image is allowed;
   determining whether the rendered frame meets a tear condition defined by the selected one of the plurality of tear thresholds; and
   communicating the rendered image frame to the display device to switch the presentation from the prior rendered frame to the rendered image frame on the display device in response to the rendered frame meeting the tear condition defined by the selected one of the plurality of tear thresholds.

15. The method of claim 14, wherein the selected one of the plurality of tear thresholds comprises a blanking period threshold.

16. The method of claim 14, wherein the selected one of the plurality of tear thresholds comprises an optically visible area threshold that defines the tear condition as corresponding to an area of an image that defines a boundary between what is optically visible to a user or not optically visible to the user.

17. The method of claim 14, wherein the selected one of the plurality of tear thresholds comprises an inconsequentially visible area threshold that defines the tear conditions as corresponding to a visible area of an image where a tear is inconsequential to a user viewing the prior rendered frame and the rendered image frame.

18. The method of claim 14, wherein the timing event is a vertical synchronization.

19. The method of claim 14, wherein the selected one of the plurality of tear thresholds is selected based on a command received by the application.

20. The method of claim 14, wherein the selected one of the plurality of tear thresholds is selected based on one or more of optics information of the display device, rendered content, and user input.

21. The method of claim 14, further comprising communicating a prior rendered frame for presentation on the display or to communicate an instruction to re-present the prior rendered frame when the rendered frame is received after the selected one of the plurality of tear thresholds.

22. The method of claim 14, wherein the display devices comprises a display that presents a portion of a prior rendered frame and switches to presenting a current rendered frame in response to the operating system receiving the rendered frame by the selected one of the plurality of tear thresholds.

23. A non-transitory computer-readable medium storing instructions executable by a computer device, comprising:
   at least one instruction for causing the computer device to render at least one image frame received from an application for a virtual reality image for display on a display device;
   at least one instruction for causing the computer device to determine that the rendered frame is received after a frame timing event that corresponds to a deadline for initiating display of a new frame;
   at least one instruction for causing the computer device to communicate a prior rendered frame for presentation on the display device or communicate an instruction to re-present the prior rendered frame on the display devices;
   at least one instruction for causing the computer device to receive a selection of one of a plurality of tear thresholds, wherein each of the plurality of tear thresholds define different tear conditions, at a point in time after the frame timing event, when an amount of tearing in a displayed image is allowed;
   at least one instruction for causing the computer device to determine whether the rendered frame meets a tear condition defined by the selected one of the plurality of tear thresholds; and
   at least one instruction for causing the computer device to communicate the rendered image frame to the display device to switch the presentation from the prior rendered frame to the rendered image frame on the display device in response to the rendered frame meeting the tear condition defined by the selected one of the plurality of tear thresholds.

* * * * *